Patented Oct. 20, 1953

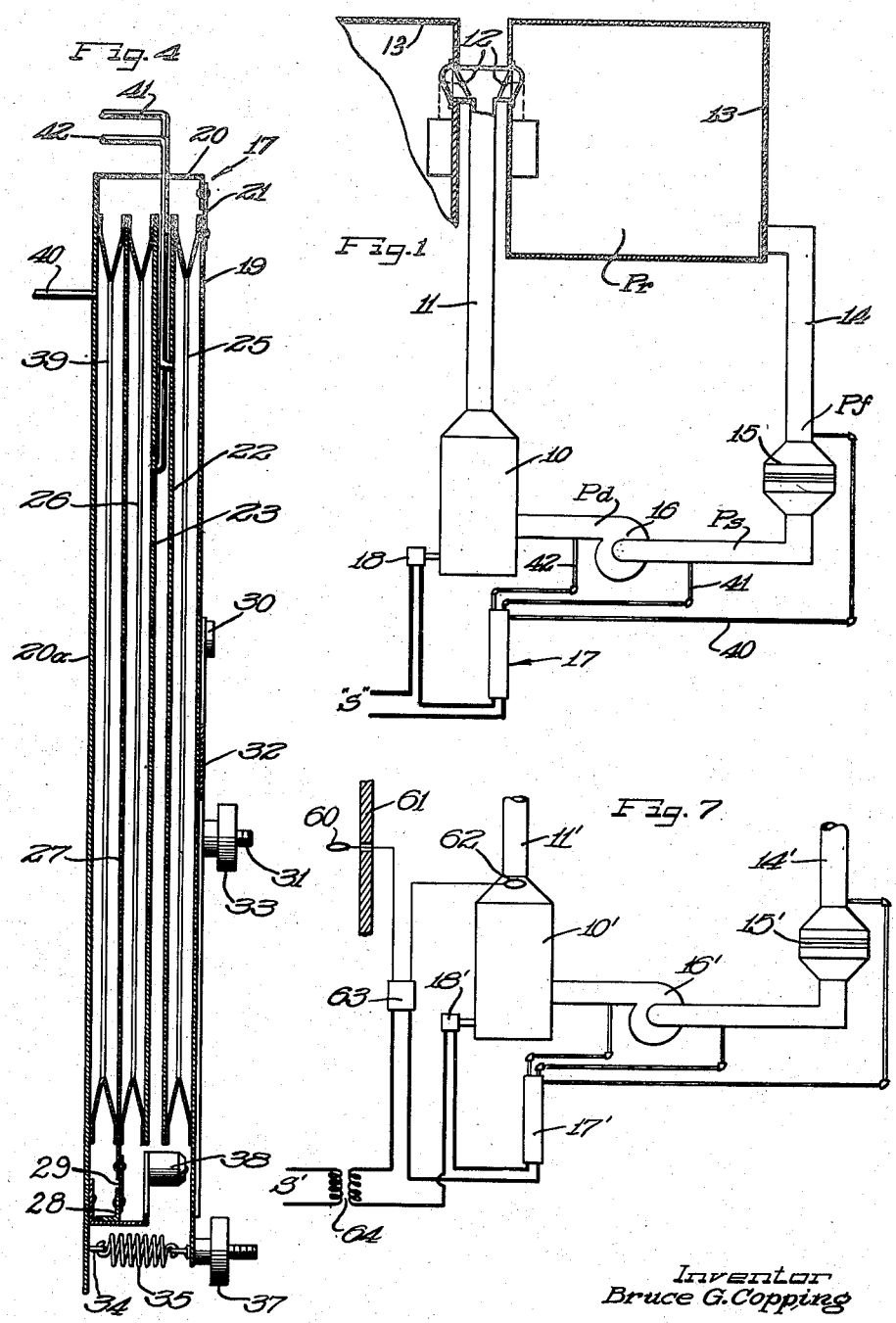

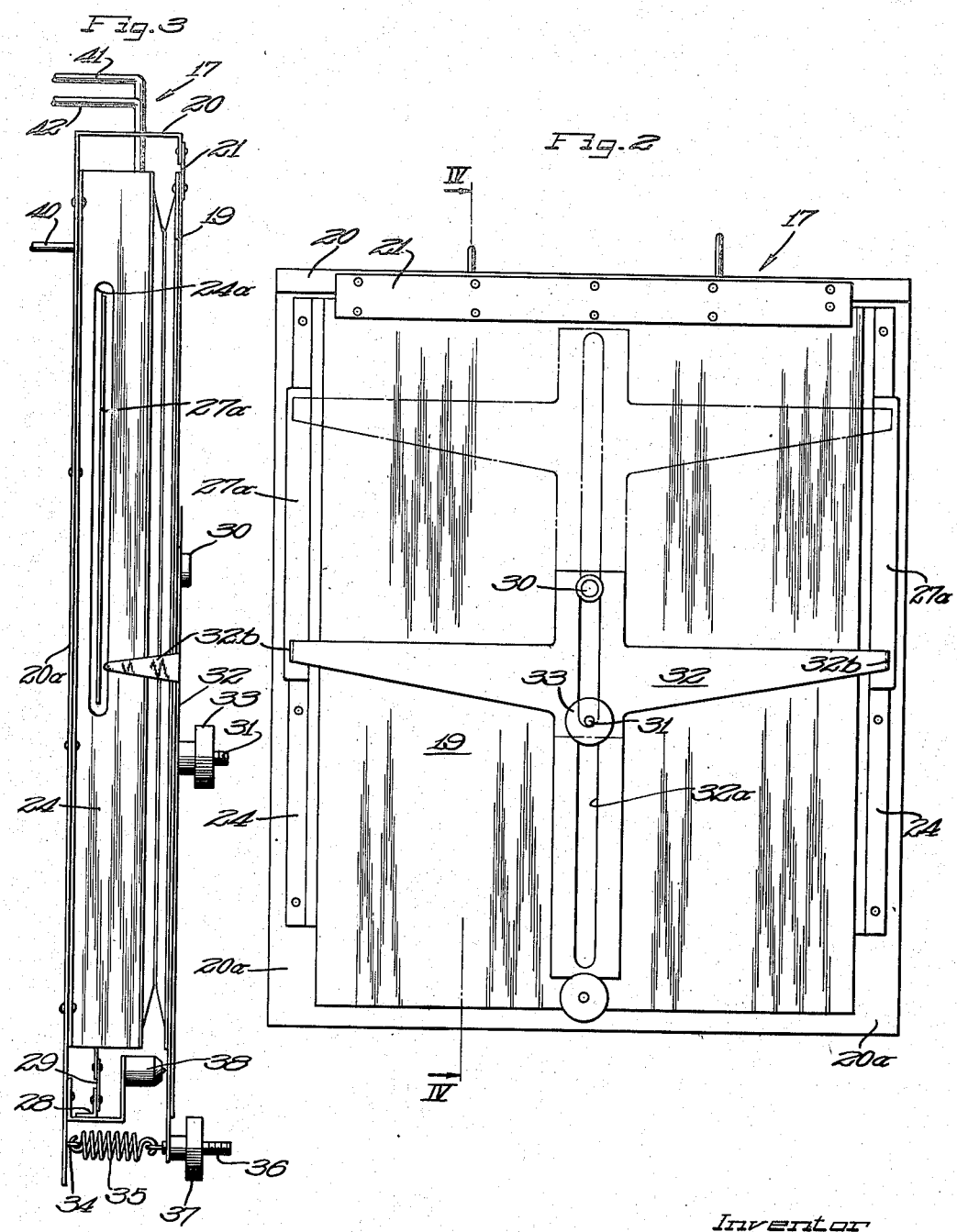

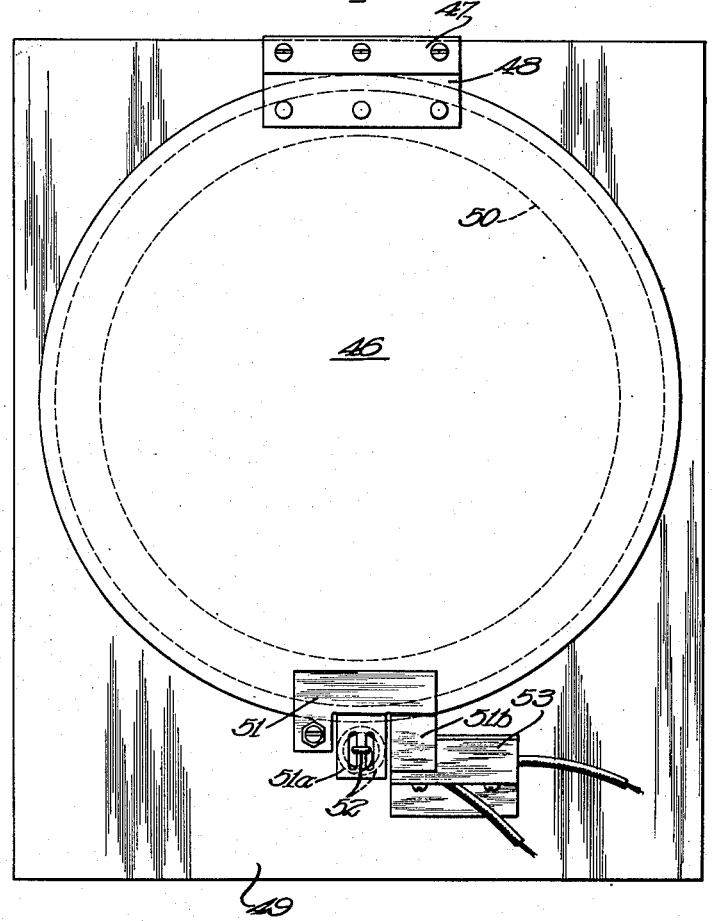
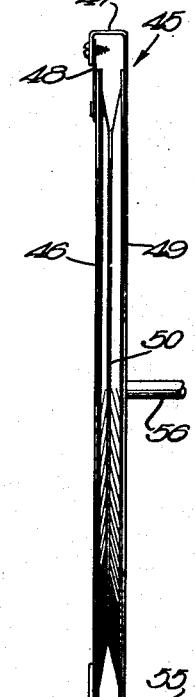

2,656,112

UNITED STATES PATENT OFFICE 2,656,112

AUTOMATIC CONDITIONED AIR SYSTEM WITH COMPENSATION FOR CLOGGING FILTER

Bruce G. Copping, Atlanta, Ga., assignor to Don Manufacturing Company, Chicago, Ill., a corporation of Illinois Application July 7, 1949, Serial No. 103,376

3 Claims. (Cl. 236—11)

The present invention relates generally to methods and devices suitable for operating temperature conditioning systems and it may be noted that the instant invention finds a particularly useful application in a pressure operated control system adapted for the regulation of a forced circulation air conditioning system.

Many living units and business establishments today are provided with temperature conditioning systems which depend upon the forced circulation of heated or cooled masses of air to attain desirable temperature standards within a space or room. Conditioning systems of this type are often times equipped with registers adapted to control the volume flow of air into the room or space being temperature conditioned. In accordance with the teachings of the art, these registers are sometimes controlled by means of thermostats which respond to temperature variations within the space or room.

It has been found, however, that individual register control alone is inadequate because it is of vital importance that the total heat transferred in the conditioning unit or heat exchanger also be regulated so as to be nearly proportional to the total heat transmission load of the temperature conditioning system.

In a warm air heating system wherein each individual room or space is provided with a thermostatically controlled register, opening and closing of the various registers will result in a pressure variation in the main air duct. This pressure variation is reflective of and proportional to the average degree of opening of all of the individual thermostatically controlled registers in the system. As the average degree of register opening increases, the pressure in the main air duct of the warm air heating system will fall and as the average degree of register opening decreases, the main air duct pressure will rise.

Inasmuch as the average degree of register opening is proportional to the average heat loss from the living unit or business establishment, it follows that the pressure in the main air duct of a warm air heating system is proportional in a determinable degree to the average heat loss from the entire living unit or the business establishment.

It is, therefore, an object of this invention to provide a pressure operated control system for a temperature conditioning system whereby the heat transmission of a temperature conditioning means may be controlled in response to variations of pressure within the main circulating duct of a temperature conditioning system.

It is well known that most temperature conditioning systems of the type wherein a forced circulation of masses of heated or cool air is utilized to temperature condition a living unit or a business establishment employ air filters in the return air system so as to provide for the removal of any foreign particles which may be carried by the circulated air.

It is also well known that filters provided for this purpose present a certain resistance to the circulation of air which varies in proportion to the degree of contamination of the filter. Although the resistance created by a clean filter element may be almost negligible, the increased resistance resulting when a filter becomes clogged and contaminated seriously affects the pressures attainable in the rest of the temperature conditioning system.

In a temperature conditioning system provided with individually controlled thermostatic registers and a filter controlled return air system, it follows that the main air duct pressure variation will not be a true and consistent index of the average heat loss of a living unit or a business establishment unless the variable resistance of the filter element is compensated for in some manner.

It is, therefore, another object of my invention to provide a pressure operated control system for a temperature conditioning system wherein complete compensation for variable filter pressure is provided so that the control system will function accurately regardless of the degree of filter contamination.

It is also desirable in the regulation of temperature conditioning systems to make provision whereby response may be had to the temperature gradients existing between the various temperatures in the room or space to be temperature conditioned, the ducts of the heating system per se, and the atmospheric temperature. A control system thus provided is adequately equipped to anticipate and respond to sharp changes in temperature resulting from rapidly changing atmospheric conditions.

Therefore, it is another object of this invention to provide a pressure operated control system for a temperature conditioning installation which may be used in combination with compensating devices, for example, an indoor-outdoor thermostatic control.

According to the general features of the present invention a pressure sensitive control device is provided with a flexible bellows operative to actuate switch means in response to pressure variations within a temperature conditioning system. One form of such a control device disclosed herein provides a plurality of flexible bellows which are arranged so as to permit a compensating reaction of one selected pressure gradient within a temperature conditioning system by one or more additional selected pressure gradients. The switch means is placed in control of an electric circuit connected to a temperature conditioner such as a furnace. This invention further contemplates the provision of compensating devices in series with the pressure sensitive control device, for example, an indoor-outdoor thermostatic control.

It is believed that my novel methods of controlling a temperature conditioning system will best be understood from the description of the structure provided for practicing the same. The novel features which I believe to be characteristic of my invention as well as the general organization and method of operation will become apparent to those versed in the art through reference to the following detailed description and the accompanying drawings in which;

Figure 1 is a diagrammatic view of a forced warm air heating system adapted for automatic control in accordance with the teachings of the present invention;

Figure 2 is a plan view of a pressure sensitive control device embodying the principles of my invention;

Figure 3 is an end elevational view of the pressure sensitive control device illustrated in Figure 2;

Figure 4 is a cross-sectional view taken on line IV—IV of Figure 2;

Figure 5 is a plan view of a pressure sensitive control device embodying the principles of my invention but modified to omit certain structures for accomplishing compensations thereof;

Figure 6 is an end elevational view of the pressure sensitive control device shown in Figure 5; and Figure 7 is a diagrammatic view of a forced warm air heating system similar to that shown in Figure 1 but augmented by an indoor-outdoor thermostatic control.

As shown on the drawings:

Referring to Figure 1, an elementary forced warm air system is diagrammatically shown and comprises a furnace 10, an air duct 11, an automatic thermostatically controlled register 12, one or more rooms 13, a return duct 14, an air filter 15 and a blower 16. The basic system is shown as being augmented by a pressure sensitive control device indicated generally by the reference numeral 17 and a furnace control device indicated at 18.

As may be seen on Figure 1, the pressure sensitive control device 17 is placed in communication with the system at a plurality of points which bear a special relation to pre-selected pressure conditions. These points of communication are identified by the reference symbol $P_d$ for pressure at the discharge of the blower 16; $P_s$ for the pressure at the suction side of the blower 16; and $P_f$ for the pressure of the air entering the filter 15. For convenience in explanation, the additional reference symbol $P_r$ is used to indicate the air pressure in the room 13.

Turning now to Figures 2, 3 and 4, the pressure sensitive control device 17 is shown as including an outer bellows plate 19 which is attached at its upper edge to a bracket 20 by means of a flexible strip 21. The bracket 20 is provided with an integral backing portion which is identified as a main back plate 20a.

Situated in spaced relationship intermediate the main back plate 20a and the outer bellows plate 19 are a pair of bellows supports 22 and 23. As may be seen on Figure 3, the bellows supports 22 and 23 are assembled in fixed relationship with the bracket 20 by means of suitable end members 24 which may be fastened to the main back plate 20a by any suitable fastening means.

An outer bellows 25 made of a flexible material and formed in the usual manner is sealed to the outer bellows plate 19 on one side and the other side is sealed to the bellows support 22.

An intermediate bellows 26 is sealed to the bellows support 23 and the other side is sealed to an inner bellows plate 27. An inner bellows 39 is sealed to the inner bellows plate 27 on one side and the other side is sealed to the main back plate 20a.

Air communication is established with the various bellows by means of a filter intake pressure tube 40 which enters the interior of the bellows 39, a blower suction pressure tube 41, which enters the interior of the intermediate bellows 26, and a blower discharge pressure tube 42, which enters the interior of the bellows 25. The pressure tubes 40, 41 and 42 are designated by like reference numerals upon the diagrammatic view of a forced warm air heating system shown in Figure 1.

The inner bellows plate 27 is hinged by means of a flexible strip 29 to a bracket 28 secured to the main back plate 20a and is therefore movably responsive to the pressures in the intermediate bellows 26 and the inner bellows 39.

In order to transmit the resulting movement of the inner bellows plate 27, a pair of suitably extending lugs are provided as at 27a, which extend through slots 24a formed in the end members 24, to engage an adjustable member carried by the outer bellows plate 19.

As may be seen on the drawings the outer bellows plate 19 is provided with a projecting guide pin 30 and a threaded stud 31 which are arranged upon the outer bellows plate in spaced relationship upon a substantially center-line axis. A slotted T-shaped member 32 provided with a lengthy slot 32a and a pair of pressure feet 32b is arranged upon the face of the outer bellows plate 19 for sliding adjustment relative thereto. Thus, the threaded stud 31 may receive an adjusting nut 33 in threaded relationship therewith which may be drawn up tightly to maintain the T-shaped member 32 in any desired adjusted position. It will be noted that the pressure feet 32b of the T-shaped member 32 are arranged for contact engagement with the projecting lugs 27a of the inner bellows plate 27.

Since the outer bellows plate 19 hinges around the flexible strip 21, it will be apparent that adjustable positioning of the T-shaped member 32 along the face of the outer bellows plate 19 will vary the point of contact engagement between the pressure feet 32b and the lugs 27a thereby permitting selective adjustment of the leverage of the inner bellows plate 27 upon the outer bellows plate 19 as may be desired.

A hook 34 is fixed to the main back plate 20a and receives a small resilient member 35 which may take the form of a coil spring. The other end of the resilient member 35 is attached to a hook formed on the end of a threaded stud 36 which is adapted to pass freely through the outer bellows plate 19. The amount of tension exerted by the resilient member 35 upon the outer bellows plate may be selectively adjusted by means of a knurled adjusting screw 37 received on the threaded stud 36.

A sensitive switch 38 which is normally open may be interposed between the main back plate 20a and the outer bellows plate 19 and is arranged in such a manner as to be actuated to a closed position whenever the outer bellows plate 19 moves inwardly beyond a certain predetermined point.

It will be evident that the blower discharge pressure $P_d$ will be manifested as a positive force whereas the filter intake pressure $P_f$ and the blower suction pressure $P_s$ will both be manifested as a negative force. Therefore, the blower discharge pressure will tend to force the outer bellows plate 19 outward against the pull of the resilient member 35 which may be considered a control spring. The negative blower suction pressure will tend to draw the inner bellows plate 27 to the right and thus a force will be transmitted through the pressure feet 32b thereby assisting the blower discharge pressure in forcing the outer bellows plate 19 outwardly. The filter intake pressure, also negative, will tend to draw the inner bellows plate 27 inwardly and will thus oppose and subtract from the outward force of the blower suction pressure. Thus, the force tranmitted to the outer bellows plate 19 will be a certain proportion of the pressure drop through the filter 15, the proportion depending upon the setting of the T-shaped member 32.

Referring again generally to Figure 1, this operation may be explained with respect to the environment of a complete heating system. It will be evident that in the system shown, there are two points of variable resistance, namely, at the filter 15 and at the thermostatic register 12. All other resistances will be fixed for any particular heating system. If it is assumed that the filter resistance does not change, it will be evident that as the register 12 opens and closes, the blower discharge pressure $P_d$ will fall and rise in a proportional relationship to the degree of register opening. However, if the resistance offered by the filter 15 is not constant it will have an effect upon the blower discharge pressure $P_d$ which will combine with the pressure varying effect resulting from the changes in register opening. Thus, the pressure obtained at the blower discharge will be decreased due to the filter resistance by an amount which will be a fixed fraction of the pressure drop through the filter.

It follows that a pressure sensitive control device 17 when incorporated in a heating system similar to that shown in Figure 1 is arranged to respond to the various pressures as shown, the net pressure exerted on the outer bellows plate 19 will be equal to the blower discharge pressure plus a certain fixed proportion of the amount of the pressure drop through the filter 15.

In operation, as the temperature of the room 13 rises, the thermostatic register 12 will close and thereby produce an increase of net pressure on the outer bellows plate 19. This increase in pressure will tend to force the bellows plate 19 outward and when a predetermined pressure has been reached, the switch 38 will be actuated to an off position. The switch 38 may be interposed in an electric circuit leading from a source "S" to the burner control device 18. When the switch 38 is actuated to its off position the burner controlled by the burner control device 18 will be deenergized.

As the room 13 cools, the thermostatic register 12 will open thereby reducing the net pressure at the pressure sensitive control device 17 and the outer bellows plate 19 will move slightly inward thereby permitting the switch 38 to be actuated to its closed position to complete the electric circuit and start the burner controlled by burner control device 18. Since the thermostatic register 12 opens and closes in response to the heat requirement of the room 13, it will be evident that the pressure sensitive control device 17 described herein achieves a method of control whereby burner operation is directly responsive to the actual overall heat requirement of the room.

It will be understood, of course, that the method of control herein described and the pressure sensitive control device provided for practicing this method are equally adaptable to regulate the operation of a temperature conditioner as and for cooling. It may also be noted that equally efficient control could likewise be established if the furnace 10 were replaced by a temperature conditioning unit adapted for combination heating and cooling.

Referring now to Figures 5 and 6, a modified form of pressure sensitive control device is indicated generally by the reference numeral 45 and is shown as comprising a bellows plate 46 which is hinged to a brackekt 47 by means of a flexible strip 48. The bracket 47 is provided with a main back plate portion 49. A bellows 50 made of a flexible material and shaped in the usual manner is sealed on one side to the bellows plate 46 and on the other side to the main back plate 49.

A clip angle 51 is provided on one end of the bellows plate 46 and is provided with a projecting portion 51a for carrying a control spring 52 and a second projecting portion 51b which may be arranged in actuating position with a sensitive switch 53.

The other end of the spring 52 may be attached to a threaded stud 54 which passes through the main back plate 49 and is threadedly engaged by a knurled adjusting nut 55. The amount of tension exerted by the spring 52 in biasing the bellows plate 46 towards the main back plate 49 may be selectively adjusted by turning the nut 55 on the threaded stud 54.

A pressure tube 56 enters the interior of the bellows 50 and may, for example, place the bellows 50 in air communication with the plenum chamber or main air duct of a temperature conditioning system.

It will be apparent that as variations in air pressure occur within the plenum chamber or main air duct of the temperature conditioning system the bellows 50 will expand or contract and thereby force the bellows plate 46 to pivot relative to the bracket 47 through the hinge joint of the flexible strip 48. When this occurs, the clip angle 51 will be moved against the spring bias of the control spring 52 and the projection 51b will be actuated relative to the sensitive switch 53.

Thus, if the sensitive switch 53 is normally closed and is placed in control of a temperature varying source such as a control burner or a cooler unit, a pressure increase in the bellows 50 in response to a lower heat transfer requirement placed upon the temperature conditioning system will cause the bellows plate 46 to move outwardly and the sensitive switch 53 will be actuated to an open position.

Conversely, if a greater heat transfer requirement is placed upon the temperature conditioning system the bellows 50 will respond to a decrease in pressure within the temperature conditioning system and the bellows plate 46 will move inwardly thereby moving the projection 51b against the sensitive switch 53. When the sensitive switch 53 is closed, the temperature varying source controlled thereby will again be energized.

It may be noted that the modified control device 45 finds a particularly useful application in controlling temperature varying source units in temperature conditioning systems where filters of constant resistance are employed.

Under certain circumstances it is desirable and advantageous to use, in conjunction with the compensating pressure control described above, a so-called indoor-outdoor thermostatic control. Referring particularly to Figure 7, an arrangement is shown whereby such a thermostatic control is employed.

As shown in Figure 7, a temperature conditioning system is diagrammatically illustrated as comprising a furnace 10', and air duct 11' for delivering temperature conditioned air to an automatic thermostatically controlled register situated in a room outlet (not shown), a return duct 14', an air filter 15' and a blower 16'.

According to this invention, the basic system is augmented by a pressure sensitive control device indicated generally by the reference numeral 17' and a furnace control device indicated at 18'. The indoor-outdoor thermostatic control is shown as comprising a thermostatic bulb 60 which is placed outside of the structure to be heated, herein indicated by the reference numeral 61, so as to be exposed to atmospheric temperatures. A second thermostatic bulb 62 is placed in the bonnet of the furnace 10'. The thermostatic bulbs 60 and 62 may be actuatingly connected to a conventional thermostatic control device indicated generally by the reference numeral 63. The thermostatic control device 63, the furnace control device 18' and the pressure sensitive control device 17' may be interposed in an electric circuit in series connection with one another. The electric circuit containing such components is shown on Figure 7 as leading from a source S' through a transformer 64.

The addition of the indoor-outdoor thermostatic control functions to maintain the bonnet temperature of the furnace 10' at a level inversely proportional to the outside temperature as measured by the thermostatic bulb 60. Thus, if the outside temperature is low, the bonnet temperature will be high. By placing such a control in series with the pressure sensitive control device 17', the swing of the bonnet temperature will be limited and the entire temperature conditioning system will yield a more consistent performance.

From the foregoing it should be seen that I have provided a novel and improved pressure operated control system for temperature conditioning a room or a plurality of spaces which utilizes variations of pressure in the system to control the transmission of heat within a temperature conditioning unit.

It should be further apparent that I have provided a novel pressure sensitive control device which provides complete compensation for variable pressures which may occur within a forced air temperature conditioning system whereby a pressure operated control system of the type described may function accurately regardless of pressure variables within the temperature conditioning system.

It will be understood that modifications and variations may be effected without departing from the scope of the novel concepts of the present invention.

I claim as my invention:

1. In a temperature conditioning system for an enclosure and including a blower having an inlet and an outlet, means coupling said inlet to the enclosure including a filter and means coupling said outlet to the enclosure including a temperature conditioner and damper means responsive to temperature within the enclosure, means controlling said temperature conditioner comprising means responsive to the gauge pressure at the blower outlet and causing operation of said temperature conditioner when said gauge pressure drops below an adjustable value, and means responsive to the differential in pressure across the filter for reducing said adjustable value as said differential in pressure increases, thereby to act in a compensating direction for variation in the resistance of the filter.

2. In a temperature conditioning apparatus for an enclosure including a fluid flow system having an inlet and an outlet to and from said enclosure and means for circulating fluid in said system, a filter in said system, means for throttling the flow of fluid in said system to change the pressure therein for controlling the conditioning of the enclosure, means responsive to said throttled pressure to effect operation of said conditioning means when the throttled pressure is changed to one side of an adjustable value, and compensating means responsive to a false change in throttle pressure, effected by the clogging of said filter, to adjust said responsive means and adjust compensatingly said adjustable value.

3. In a temperature conditioning apparatus for an enclosure including a fluid flow system having an inlet communicating with said enclosure and means for circulating fluid in said system, a filter in said system, means for throttling the flow of fluid in said system to change the pressure therein for controlling the conditioning of the enclosure, means responsive to said throttled pressure to effect operation of said conditioning means when the throttled pressure is changed to one side of an adjustable value, and compensating means responsive to a false change in throttle pressure, effected by the clogging of said filter, to adjust said responsive means and adjust compensatingly said adjustable value, said throttling means being located at said enclosure.

BRUCE G. COPPING.

References Cited in the file of this patent

UNITED STATES PATENTS

| Number | Name | Date |
| --- | --- | --- |
| 1,583,238 | Scudder | May 4, 1926 |
| 2,072,166 | Goodman | Mar. 2, 1937 |
| 2,193,923 | Hillen et al. | Mar. 19, 1940 |
| 2,196,687 | Steinfeld | Apr. 9, 1940 |
| 2,275,866 | Runaldue | Mar. 10, 1942 |
| 2,440,052 | Lingen et al. | Apr. 20, 1948 |
| 2,481,612 | Nicholson | Sept. 13, 1949 |
| 2,495,861 | Newton | Jan. 31, 1950 |
| 2,537,121 | Copping | Jan. 9, 1951 |
| 2,579,507 | MacCracken | Dec. 25, 1951 |